Patented May 18, 1943

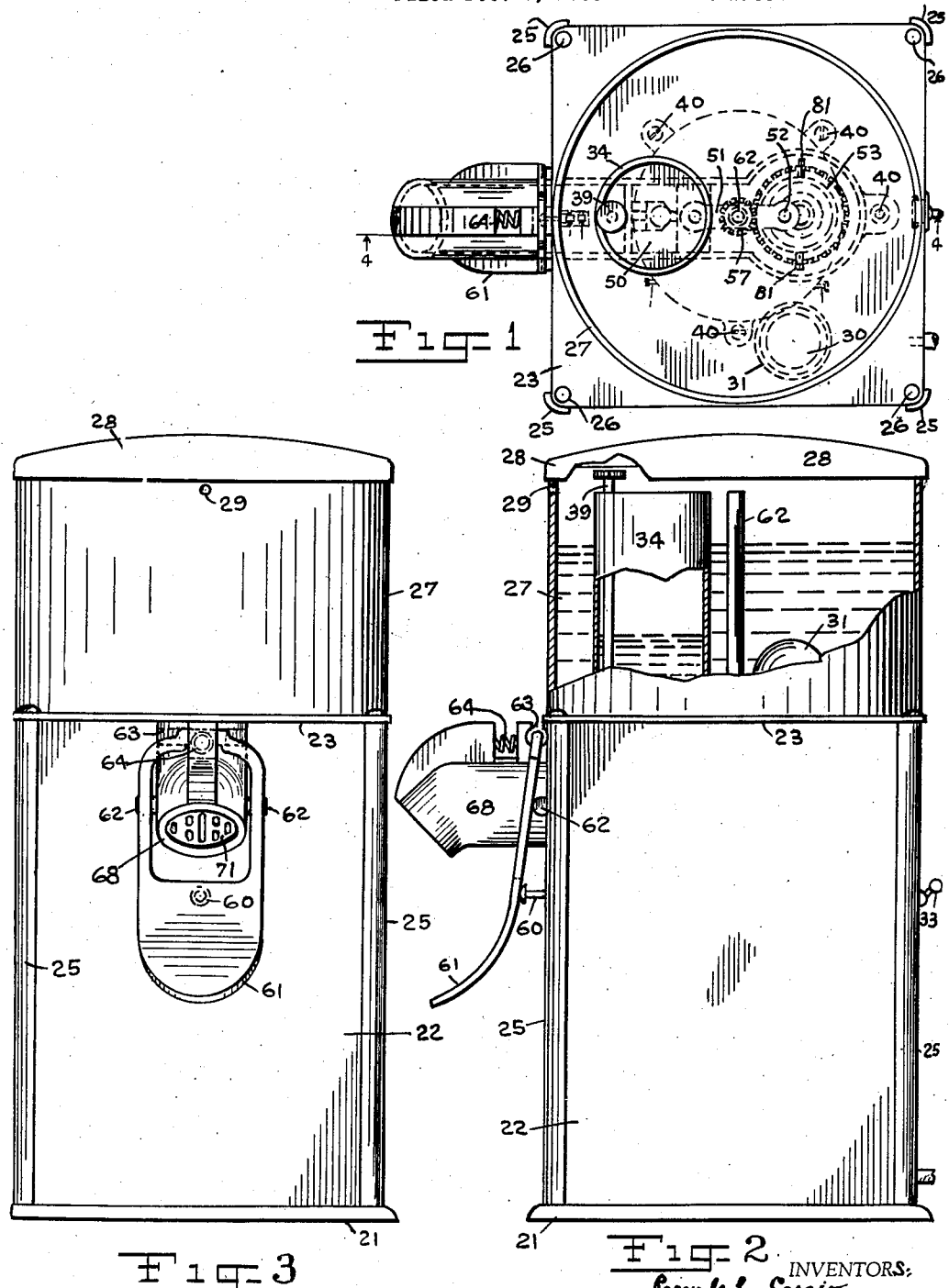

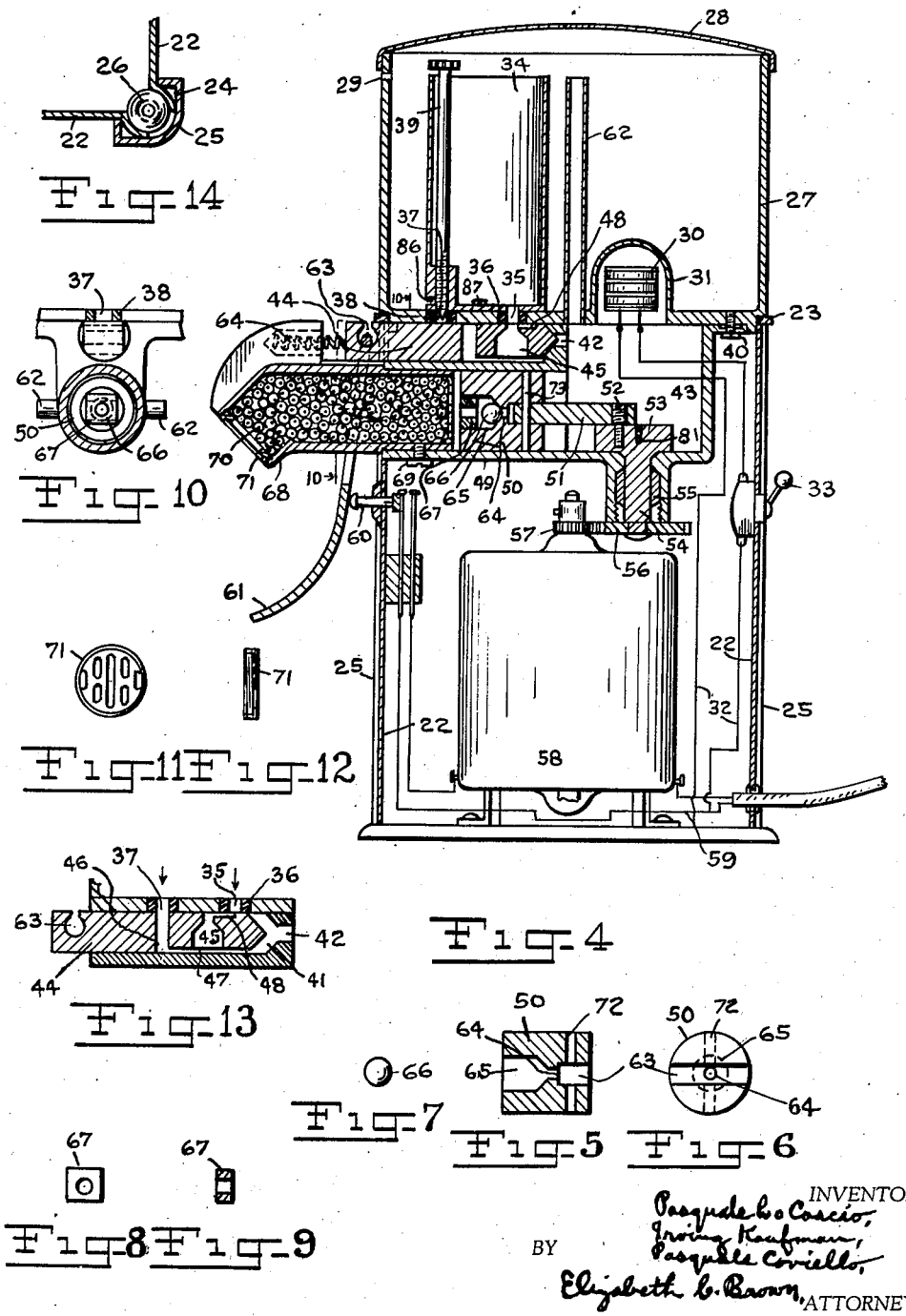

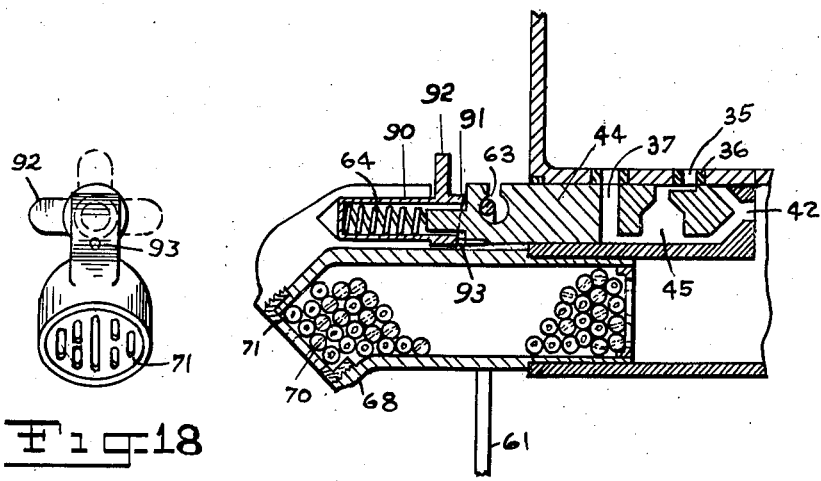
Fig. 18
Fig. 15
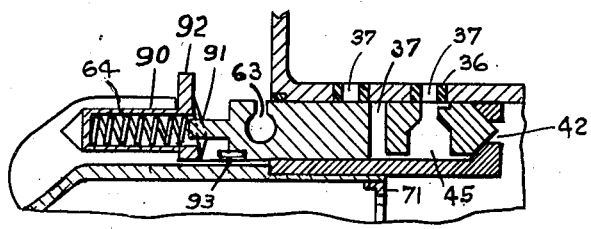
Fig. 16
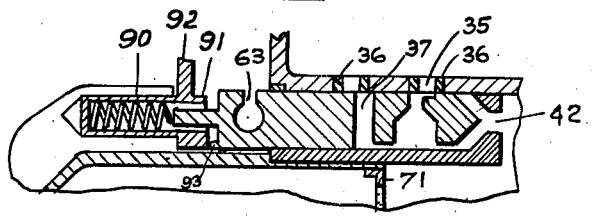
Fig. 17

2,319,244

UNITED STATES PATENT OFFICE 2,319,244

AUTOMATIC LATHER MACHINE

Pasquale Lo Cascio and Irving Kaufman, Brooklyn, N. Y., and Pasquale Coviello, Woodcliff, N. J.

Application December 7, 1938, Serial No. 244,448

10 Claims. (Cl. 299—83)

This invention relates to devices for producing lather, in a sanitary and convenient manner.

One of the principal objects of the invention is to provide simple and efficient means for the production of lather, suitable for use in barber shops, beauty parlors, and the like.

Another object is to provide a machine which may be operated intermittently, for any required length of time, and will remain in a condition ready for operation while idle.

Another object is to provide a machine which, when actuated, will automatically produce a supply of lather of homogeneous consistency.

Another object is to provide means by which the consistency of the lather to be produced may be regulated or controlled from time to time as desired.

Another object is to produce such lather of a predetermined or any desired temperature.

Another object is to provide such a machine which can easily and conveniently be kept in a clean and sanitary condition, and in which the valves, mixing chamber and other interior parts may be thoroughly washed without disassembling the same.

Another object is to provide such a machine which shall be neat in appearance, and of such size as to be conveniently portable when desired.

Further objects and advantages of the invention will be in part set forth in the following specification, and in part will be obvious therefrom without being specifically pointed out, the same being realized and attained as hereinafter more fully described or as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the accompanying drawings,

Fig. 1 is a top view of a machine constructed according to one embodiment of our invention;

Fig. 2 is a side view thereof, partly broken away to show a portion of the interior;

Fig. 3 is a front view;

Fig. 4 is a vertical section, taken on the line 4—4 of Fig. 1;

Fig. 5 is a cross section of the lather-expelling piston;

Fig. 6 is an end view thereof as seen from the right of Figs. 4 and 5;

Fig. 7 shows the ball which forms a part of the lather valve within the piston;

Figs. 8 and 9 are respectively a face view and section of the ball retainer;

Fig. 10 is a section on the line 10—10 of Fig. 4;

Figs. 11 and 12 are views of one of the grilles which are attached over the inlet and outlet of the lather spout;

Fig. 13 is a section of the mixing valve and valve chamber, removed from the machine, and shown in its operative position;

Fig. 14 is a section of one corner of the lower main case, looking vertically;

Fig. 15 is a sectional view of a modified form of mixing valve, showing same in its operative position and arranged to produce a lean mixture of soap and water;

Fig. 16 is a section of same in its inoperative position;

Fig. 17 is a section of same, in its operative position and arranged to produce a rich mixture of soap and water; and Fig. 18 is a view similar to Fig. 10, but showing the modification of Figs. 15 to 17 inclusive.

In carrying our invention into effect in the embodiment thereof which is illustrated in Figs. 1 to 14 inclusive, it will be seen that there is provided a lower main case comprising a base plate 21, side plates 22, and a top plate 23. The manner in which the main case is assembled will be more fully referred to below.

At the top of the machine is a water reservoir 27, provided with a removable cover 28. The water contained in this reservoir 27 may if desired be heated by an electric heating unit such as the one shown at 30 in Fig. 4, or by other means. The unit 30 is shown as located inside the dome 31, and operates from the circuit 32, which is controlled by the switch 33 at the back of the machine.

Mounted within the water reservoir 27 and secured by means of a screw 87, is a reservoir 34 for liquid soap, having at the bottom an outlet 35 provided with a rubber ring or washer 36 (see Figs. 4 and 13).

The water reservoir is provided at the bottom with an outlet 37, which may be regulated by a valve 39, and which is provided with a rubber washer 38.

The assembly comprising the valve, mixing chamber, and spout is mounted on the under side of the water reservoir by means of screws 40. The mixing-valve chamber is shown at 41 in Figs. 4 and 13, and the outlets 35 and 37 of the soap and water reservoirs respectively open into this chamber. The outlet 42 opens from the valve chamber 41 into the mixing chamber 43.

The mixing valve 44 is a slide valve, shown in its closed position in Fig. 4 and in its open position in Fig. 13. When in the position of Fig. 4 the passages 37 and 42 are closed, but the passage 35 is completely open, and will permit soap in liquid form from the reservoir 34 to enter and fill the secondary soap reservoir 45, where it will remain, ready for use at any time, until the valve 44 is operated.

When the valve 44 is slid into the position shown in Fig. 13, the passages 37 and 42 are opened, allowing water in such quantity as shall be permitted by the setting of the valve 39 to pass through the channels 46 and 47, and to drip into the mixing chamber through the passage 42. Since the secondary reservoir 45 is open at the bottom into the channel 47, the water passing through this channel 47 will carry with it soap from the secondary reservoir 45. While the valve 44 remains in the position of Fig. 13, the soap passage 35 is partly although not entirely closed, and soap can still enter the secondary reservoir 45 through the offset inlet 48 in order to replace the soap removed therefrom in operation.

The mixing chamber 43 is provided with an outlet cylinder 49, having a piston 50 driven by a piston rod 51 eccentrically mounted at 52 upon a driving cam 53. The cam 53 is integral with a drive shaft 54 journaled in a sealed bearing 55 and having at its lower end a gear 56. This gear 56 may be driven by any suitable means, such as the gear 57 mounted on the shaft of the motor 58 as shown in Fig. 4. This motor is shown as being operated from the circuit 59 and controlled by an open circuit resilient push button switch 60. The switch 60 is operated by the hand lever 61 which is fulcrumed at 62 against the main case and journaled at 63 to the slide valve 44. The spring 64 normally retains both the valve 44 and lever 61 in their inoperative positions, but when the lever 61 is operated the valve 44 is moved into the position shown in Fig. 13, and the circuit 59 is closed through the switch 60. It will be seen, however, that the upper end of the lever 61 fits loosely in the notch 63, and therefore the lever can move a short distance in the notch without operating the valve; consequently the lower end of the lever first pushes in the button of the switch 60, and after the circuit is closed the upper end of the lever opens the valve 44.

When the piston 50 is operated, the action of this piston and the action of the piston rod 51 and cam 53 serve to thoroughly mix and churn into a coarse froth the soap and water which has been allowed to drip into the mixing chamber, and this action is assisted by a pair of laterally extending, oppositely pitched beating wings 81, which are mounted on the cam 53.

The mixing chamber 43 is provided with an air vent 62, which is open at all times, in order to permit a flow of air to partly compensate for the variation in capacity of the mixing chamber due to the motion of the piston 50, and thus to insure that the drip of soap and water through the passage 42 will not be interfered with by reason of variable air pressure, while still permitting froth to be forced through the passage 64 as will now be described.

The piston 50 is provided with a transverse recess 63 which serves not only to accommodate the piston rod 51 (journaled at 72 by means of a pin 73), but also to permit the escape of froth from the chamber 43 through the passage 64 into the valve chamber 65 which is located within the outer end of the piston 50. The valve chamber 65 is provided with a ball 66 adapted to close the passage 64 when the piston is moving outward in order to prevent the backflow of lather from the valve chamber 65 into the mixing chamber 43. When the piston is moving inward, however, the ball 66 leaves the passage 64 open, and is retained within the chamber 65 by the nut 67. This nut 67 is shown separate from the piston in Figs. 8 and 9, but is firmly held in the position shown in Fig. 4, being jammed into placed or otherwise secured, where it retains the ball 66 but permits passage of mixture outward around the ball.

The spout 68 is mounted in place by means of the screw 69 and is provided with a porous packing 70. As the froth from the chamber 43 is forced through this packing, it is formed into lather, and is delivered ready for use. In the embodiment shown, the packing consists of small glass beads, of ordinary centrally-perforated type, the froth being forced between and through the beads and being thereby reduced to an even and satisfactory consistency or texture.

Slotted washers 71 are provided at the inner and outer ends of the spout, to retain the packing in place, while permitting the passage of lather. The outer washer 71 and the inside of the outer end of the spout are reciprocally screw-threaded, whereby this washer is removably secured, thus permitting easy removal of the packing beads for cleaning, and quick and convenient replacement thereof. In the case of the glass beads, the same would be merely removed, washed, returned to place, and the outer washer again screwed in.

Some other suitable material or materials may be used for the packing, if desired, although the glass beads above referred to have been found the most satisfactory. The packing material may be either porous in itself, or produce a porous effect in the aggregate, in order to break up the bubbles of lather and reduce the same to an even and close consistency. For instance, stainless steel wool has been found good for the purpose, as have also sponge and cotton. Copper wool or other metal might be used, or glass wool; glass balls might be used instead of perforated beads, or ball bearings, or bronze, stainless steel or other metal balls. Any substance which will serve the purpose may be used.

The main casing of the device, as shown, is formed of flat side plates 22, each of which is curved at its vertical edge, as indicated in the detail view Fig. 14. At each corner, a vertical clamping member 25 engages two adjacent plates, bearing inwards at the line of bending, and thus tending to force them together at that point. A rod 26 is placed within the curved edges, in turn forcing the same outward against the resiliency of the corner member 25. Screws or bolts pass through the top and bottom plates of the casing, into the ends of the rod 26. The parts are thus fastened together in a simple, inexpensive and secure manner, which is believed to be in itself novel. A neat and in fact ornamental outside effect is also produced, as the corner members 25 appear as square posts at the corner edges of the flat plates 22. These corner posts could equally well be round instead of square if desired.

If preferred, a tube may be used instead of the rod 26, and a long bolt inserted therethrough, with a nut at the bottom.

The top plate 23 of the main casing has a circular opening, which receives the bottom of the water reservoir, as shown.

If desired, a thermostatic control might be incorporated in the heating circuit, instead of controlling the same by the switch shown; it is also obvious that, while an electric motor and heating unit have been shown and described, other sources of power or heat could be employed if electricity should be unavailable or its use should not be preferred.

In the operation of the above described embodiment of our invention the water reservoir 27 and soap reservoir 34 are filled, to such height as desired, whereupon soap will automatically fill up the secondary soap reservoir 45, and the machine will be ready for use at any time, but may be left in this condition until needed. Whenever lather is required, either in large or small quantities, and at either frequent or infrequent intervals, the lever 61 is pressed inward, which first closes the switch 60 and the circuit 59, and then operates the slide valve 44. Water is thus admitted to the valve chamber where it takes up soap from the secondary reservoir 45, and a mixture of soap and water will drip through the passage 42 into the mixing chamber 43 as long as the lever 61 is held in an operative position. When the lever 61 is released the valve 44 will return to its inoperative position and the dripping of water and soap through the passage 42 will be cut off, but the secondary reservoir 45 will again fill with soap, and the machine will thus be always ready for operation. The heating unit 31 is to be operated as required in order to maintain the desired temperature in the water reservoir, and since the soap reservoir is surrounded by the water reservoir, this temperature will be communicated to the contents of the soap reservoir. The flow of water into the valve chamber 41 may be adjusted by means of the valve 39, in order to procure any relative proportion of water and soap, according to the consistency of lather desired.

The closing of the circuit 59 starts the motor 58, which operates the cam 53, with its attached wings 81, the piston rod 51, and the piston 50, the motion of which operates to thoroughly mix the soap and water which drip through the passage 42. The reciprocating motion of the piston 50 will force air alternately in and out through the vent 62, but the air pressure within the mixing chamber 43 will remain sufficiently equalized so that the dripping in of the soap and water as well as the discharge of the lather will not be interfered with by reason of undue air compression in the mixing chamber 43, while retaining enough pressure to facilitate frothing of the mixture.

The soap and water in the chamber 43 will be mixed or churned and pumped into the spout 68 through the one-way valve in the piston 50. When the piston 50 operates on the outward stroke, the passage 64 will be closed by the ball 66, and any lather which may be in front of the piston 50 will be forced through the rear grille 71 into the packing 70 of the spout 68. When the piston 50 operates on the inward stroke, the passage 64 will be opened so that the froth from the chamber 43 can fill up the valve chamber 65, while the suction between the front of the piston 50 and the rear grille 71 will draw the same out of the chamber 65 past the nut 67, which nut permits the outward passage of same at any time. Since the resistance to the passage of mixture outward through the piston 50 is less than the resistance of the packing 70 against backward flow of lather, the flow of lather will continue in an outward direction through the spout as long as the machine is operated.

The froth is formed into lather and also homogenized in consistency as it passes through the packing 70, and is finally discharged through the outer grille ready for use. Lather will be discharged from the spout 68 as long as the machine is operated, but as soon as the lever 61 is released the flow of lather will cease, although the machine will still remain in readiness for operation at any time required.

When it is desired to clean the interior of the machine, the top cover is removed, the air vent closed by placing a finger over the upper end, and the machine operated, thus causing water to be sucked from the reservoir and circulated through the interior of the machine and out through the spout, for such time as desired, in a manner which will be readily understood, thus thoroughly washing the valves, mixing chambers, etc., whereby the device may be kept always clean, fresh and sanitary, without any necessity of disassembling the same.

A modified form of control of the feeding of water and soap is illustrated in Figs. 15, 16, 17 and 18. The outer end of the spring 64 lies in a sleeve 90, mounted above the spout 68. At the inner end of this sleeve and integral therewith is a cam 91, having an inclined inner face. A small handle 92 is provided for rotating the cam. A pin 93 on the outer end of the slide valve 44 bears against the face of the cam when the valve is opened.

By turning the cam into the position shown in Fig. 15, the valve is permitted to open to its fullest extent, the pin 93 then bearing against the thinnest portion of the cam. In the position shown in Fig. 17, the valve opens to its least extent, the pin 93 bearing against the thickest portion of the cam 91. In Fig. 16 the valve is shown in its inoperative position and the cam 91 in an intermediate position is shown, wherein the pin would bear against the cam midway between its thickest and thinnest portions.

The relative positions of the outlets from the water and soap reservoirs into the valve-chamber 41, are also changed in this modification, whereby the relative quantities of water and soap are controlled and thereby the consistency of the lather. It is believed that these relative positions will be entirely clear, from the drawings, without detailed description.

By the use of this form of control device, a predetermined consistency of lather may be immediately secured, without removing the cover of the reservoir, and the same may be changed as often as desired, merely by turning the cam 91.

The remainder of the construction and operation of the machine are substantially the same as in the embodiment first described, except for the preferable omission of the interior adjusting valve 39.

By employing the above described invention in either of the embodiments disclosed, the user will be enabled to procure at any time and in any quantity a supply of lather of any desired consistency, uniform in quality and temperature, which can be quickly and easily made, with a minimum risk of contamination. The machine will deliver lather rapidly in quantities when required, but may be left idle for any length of time and still be ready for use. Even after being idle over night or over a week end or holiday, it will be necessary only to heat the reservoirs in order to prepare for operation. The barber who employs the machine will conserve the time required to make up lather by hand and thus work more efficiently, while the customer will receive the benefits of superior lather and greatly improved sanitation.

Many other advantages of the invention will be obvious from what has been above set forth with regard to its construction and operation.

We do not limit ourselves to the particular details of construction set forth in the foregoing specification and illustrated in the accompanying drawings, as the same refer to and set forth only certain embodiments of the invention, and it is obvious that the same may be modified, within the scope of the appended claims, without departing from the spirit and scope of the invention.

Having thus described our invention, what we claim as new and desire to secure by Letters Patent is as follows:

1. An automatic lather machine comprising a water reservoir, a primary soap reservoir, a mixing chamber, a valve having a water passage, and a soap passage adapted to feed water and soap into said mixing chamber, a secondary soap reservoir in said valve, the intake of said secondary reservoir being provided with an inlet having its main portion in register with the outlet of said primary reservoir when said valve is in its closed position, and having a constricted portion in register with said outlet when said valve is in its open position, a delivery spout in which lather may be formed, and means adapted to agitate and to force mixture out of said mixing chamber into said spout.

2. An automatic lather machine comprising a water reservoir, a soap reservoir, a mixing chamber, a valve having a water passage, and a soap passage adapted to feed water and soap into said mixing chamber, a delivery spout in which lather may be formed, reciprocating means adapted to agitate and to force lather out of said mixing chamber into said spout, and a valve located within said reciprocating means and adapted to permit the passage of mixture in an outward direction only from said mixing chamber.

3. An automatic lather machine comprising a water reservoir, a soap reservoir, a mixing chamber, a valve having a water passage, and a soap passage adapted to feed water and soap into said mixing chamber, a delivery spout in which lather may be formed, and means adapted to agitate and to force mixture out of said mixing chamber into said spout; said means comprising a piston having an internal outwardly operating one-way valve, a piston rod adapted to drive said piston, said piston rod being mounted eccentrically with relation to a drive shaft, and actuating means adapted to automatically drive said shaft.

4. An automatic lather machine comprising a water reservoir, a soap reservoir, a mixing chamber, a valve having a water passage, and a soap passage adapted to feed water and soap into said mixing chamber, a delivery spout in which lather may be formed, and means adapted to agitate and to force mixture out of said mixing chamber into said spout, said means comprising a piston having an internal outwardly operating one-way valve, a piston rod adapted to drive said piston, said piston rod being mounted eccentrically with relation to a drive shaft, wings extending laterally with relation to said drive shaft, and actuating means adapted to drive said shaft.

5. An automatic lather machine comprising a water reservoir, a soap reservoir, a mixing chamber, a valve adapted to feed water and soap into said mixing chamber, a delivery spout in which lather may be formed, and means adapted to agitate and to force lather out of said mixing chamber into said spout, said valve comprising a sliding member operating in a valve chamber below the water and soap outlets from said reservoirs, a vertical water passage in said sliding member adapted when in open position to register with the water reservoir outlet, a vertical soap passage adapted when said valve is in fully closed position to register with the soap reservoir outlet, having an enlarged lower portion forming a secondary soap reservoir, a constricted horizontal passage connecting said soap passage with said soap reservoir outlet when said valve is in open position, an outlet from said valve chamber permitting soap and water to pass from said valve chamber to said mixing chamber when said valve is in open position, and a constricted horizontal passage leading from said vertical soap and water passages to said last-named outlet.

6. A construction as defined in claim 2, together with a porous packing in said spout adapted to form lather from said mixture.

7. An automatic lather machine comprising a water reservoir, a soap reservoir, a mixing chamber, a longitudinally sliding valve intermediate said rseervoirs and said mixing chamber, said reservoirs having outlets adjacent said valve and said valve having a water passage and a soap passage the inlets of which adjustably register with the outlets of said reservoirs respectively and which passages are adapted to feed water and soap from said reservoirs into said mixing chamber, a delivery spout connected with said mixing chamber, and means in said mixing chamber adapted to agitate and to force mixture out of said mixing chamber into said spout.

8. An automatic lather machine comprising a water reservoir, a soap reservoir, a mixing chamber, a sliding valve intermediate said reservoirs and said mixing chamber, said reservoirs having outlets adjacent said valve and said valve having a water passage and a soap passage therethrough adapted to feed water and soap therethrough into said mixing chamber and the inlets of which adjustably register with the outlets of said reservoirs respectively, whereby the flow of water and soap to said mixing chamber from said reservoirs may be adjustably controlled, and means adapted to adjustably limit the movement of said valve and thereby said flow of water and soap, comprising an adjustable cam having an inclined face and a cooperating extension on said sliding valve, said cam being positioned in the path of said sliding valve and having its inclined surface abutting against the slide valve when in its opened position, a delivery spout connected with said mixing chamber in which lather may be formed, and means in said mixing chamber adapted to agitate and to force mixture out of said mixing chamber into said spout.

9. A construction as defined in claim 8, in which the inlets of said water and soap passages in the valve are differently spaced from the outlets of said water and soap reservoirs, whereby the relative amounts of water and soap flowing through said valve may be controlled by sliding movement of said valve relative to said outlets.

10. An automatic lather machine comprising a water reservoir, a soap reservoir adjacent thereto, a mixing chamber below said water reservoir, a longitudinally sliding valve intermediate said reservoirs and said mixing chamber, said reservoirs having outlets adjacent said valve and said valve being provided with a water passage, the inlet of which adjustably registers with the outlet of said water reservoir, with a secondary soap reservoir, the inlet of which adjustably registers with the outlet of said primary soap reservoir, and with a relatively constricted passage through which water and soap together may drip out of said valve into said mixing chamber, a delivery spout connected with said mixing chamber in which lather may be formed, and means in said mixing chamber adapted to agitate and to force mixture out of said mixing chamber into said spout.

PASQUALE LO CASCIO.
IRVING KAUFMAN.
PASQUALE COVIELLO.